Figure 1:
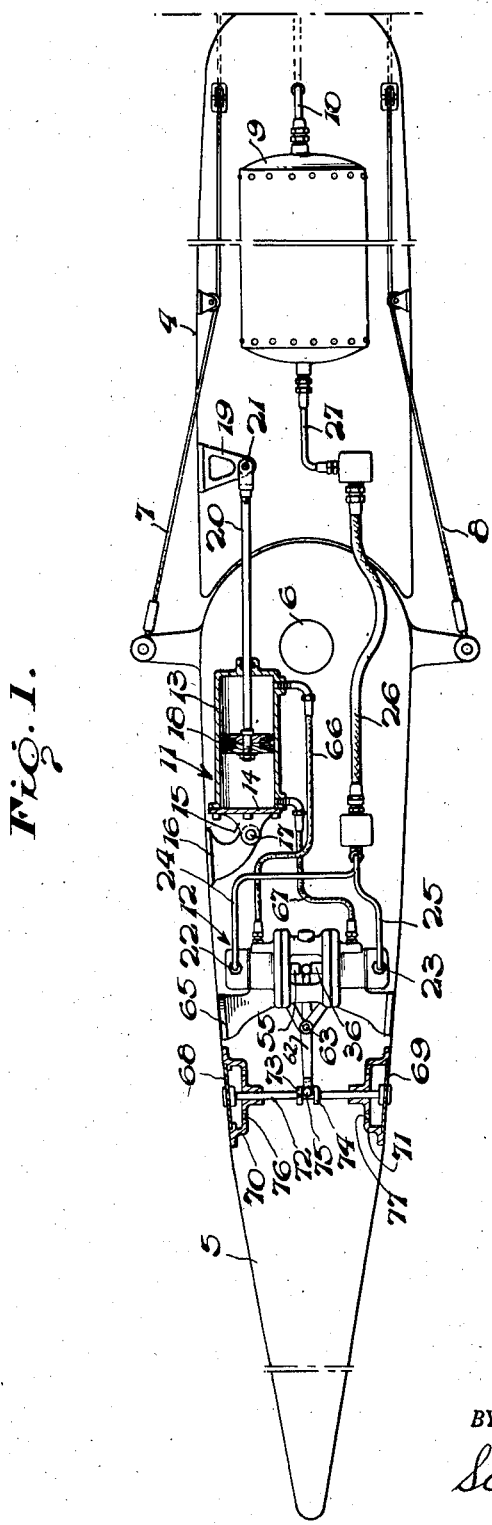

July 16, 1946.    W. A. EATON    2,404,281
FLUID PRESSURE CONTROL MECHANISM
Filed May 27, 1944    2 Sheets-Sheet 1

INVENTOR.
Wilfred A. Eaton.
BY
Scrivener + Parker.
ATTORNEYS

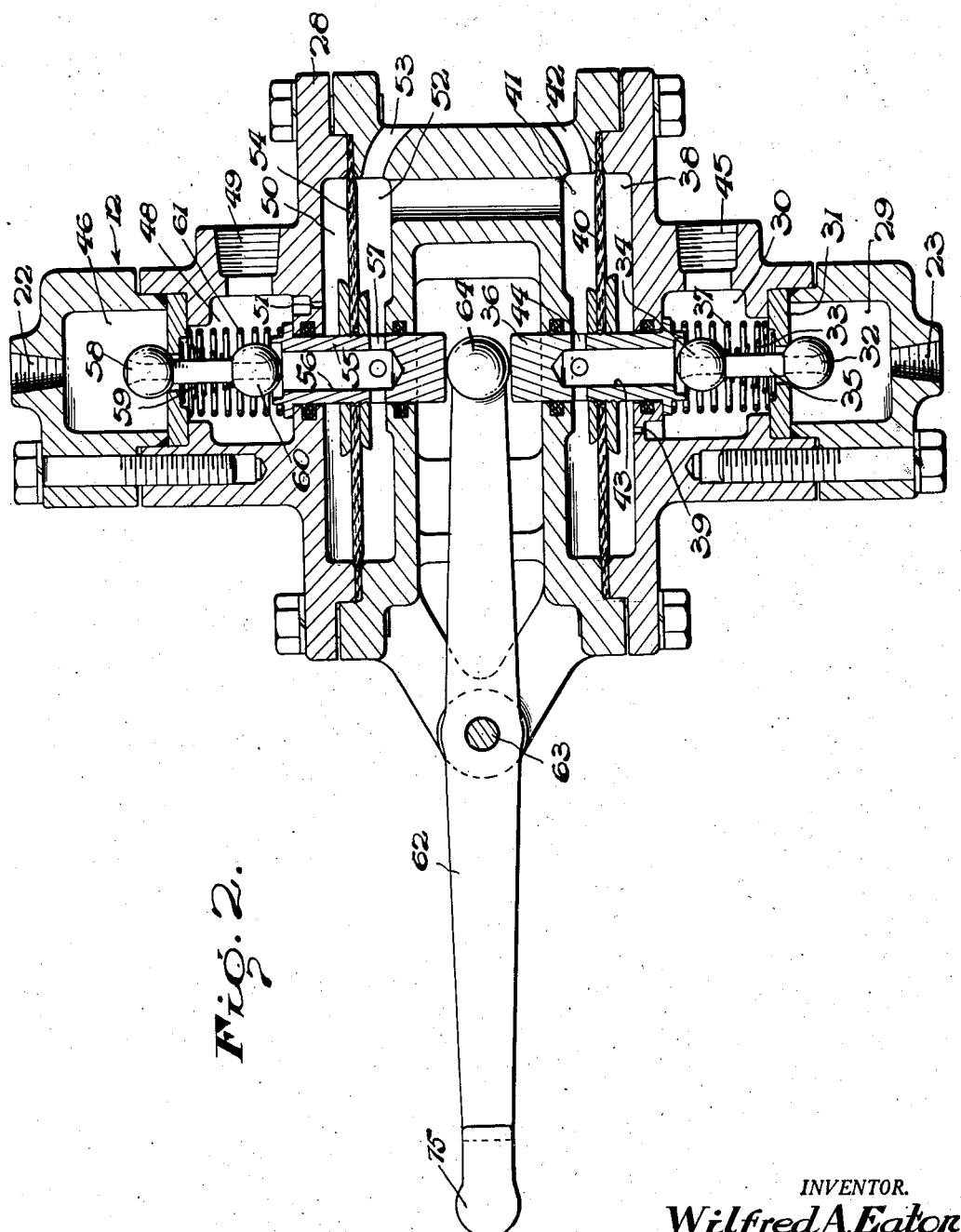

Patented July 16, 1946

2,404,281

UNITED STATES PATENT OFFICE 2,404,281

FLUID PRESSURE CONTROL MECHANISM

Wilfred A. Eaton, Elyria, Ohio, assignor to Bendix-Westinghouse Automotive Air Brake Company, Elyria, Ohio, a corporation of Delaware Application May 27, 1944, Serial No. 537,709

15 Claims. (Cl. 114—144)

This invention relates to control mechanism, and more particularly to fluid pressure operated mechanism for controlling the operation of a control surface of a body adapted to move through a fluid medium, such as a boat or an airplane.

It has previously been proposed to provide power means for actuating the control surface of an airplane, for example, but in most cases the mechanism for controlling the supply of power to the actuator in systems of this type has been controlled through the medium of a lost motion connection between the operator's control element and the surface of the device to be operated, the result being that this lost motion has resulted in an unstable condition, and often times in flutter or vibration of the control surface which has been severe enough to render the airplane uncontrollable by the operator, and it is accordingly an object of the present invention to provide means for effecting power operation of such a control surface or rudder so constituted as to overcome these difficulties.

Another object of the invention is to provide, in connection with a rudder adapted to be operated manually by the pilot, means controlled by the impact pressure of the slip stream of the fluid medium in which the airplane operates for varying the degree of power supplied to the actuator in accordance with variations in the value of the impact pressure.

Yet another object of the invention is to provide in connection with a manually operable rudder, means for effecting power operation of the rudder. and for varying the degree of power operation in accordance with the degree of movement of the rudder from its normal neutral position.

Still another object of the invention is to provide in connection with a manually operable rudder, means responsive to the impact pressure of the slip stream for varying the degree of power supplied to the rudder actuator in accordance with the speed of the airplane or boat on which the rudder is mounted.

A further object of the invention is to provide in connection with a control system of the above type, means for automatically limiting the degree of power supplied to move the rudder, to a value such that the restoring moment due to the impact pressure of the slip stream on the rudder tending to turn the rudder to neutral position will at all times be greater than the moment tending to move the rudder away from neutral position as a result of the operation of the power actuator.

A still further object of the invention is to provide fluid pressure operated means for effecting operation of a rudder of the above type, together with control valve means for controlling the supply of fluid pressure to the motor, so constituted as to permit the control valve means to be controlled jointly by the pressure supplied to the fluid motor and by the force resulting from the impact pressure of the slip stream on the surface of the rudder.

Yet a still further object of the invention is to provide, in connection with a manually operable rudder, means for controlling the operation of a power actuator for the purpose of assisting in the operation of the rudder, this means being so constituted as to permit a direct mechanical connection between the rudder and the operator's control element without the need for any lost motion connection for the purpose of operating the control mechanism.

These and other objects and novel features of the invention will become more readily apparent when taken in connection with the accompanying drawings and in the light of the following description, but it is to be expressly understood that the description is not to be taken as limiting the invention, reference being had for this purpose to the appended claims.

In the drawings, Fig. 1 illustrates diagrammatically, and partially in section, a control system embodying the present invention as incorporated in an airplane; and Fig. 2 is a view, partially in section, of the control valve mechanism shown in Fig. 1.

Referring more particularly to Fig. 1, a portion of an airplane 4 is provided with a rudder 5 having a shaft 6, the shaft being pivotally mounted on the airplane 4 by means of suitable brackets. Operation of the rudder in either direction may be effected normally by means of cables 7 and 8 which may be connected to the pilot's rudder bar, not shown, and it is understood that the rudder may be turned through the operation of the cables or by any other suitable means. Thus on movement of the cable 7 to the right, the rudder 5 is rotated in a clockwise direction, movement of the cable 8 to the right serving to rotate the rudder in the opposite direction.

In order to provide for power operation of the rudder, in addition to the type of operation described in the preceding paragraph, a reservoir 9 is mounted on the airplane and supplied with fluid pressure by a compressor, not shown, through a conduit 10, the fluid pressure from this reservoir being supplied to a double acting fluid motor 11 through suitable connections later to be described, and under the control of a valve mechanism 12, shown more in detail in Fig. 2. In the embodiment shown, the fluid motor 11 is provided with a cylinder 13 having a cover plate 14 provided with a bracket 15 which is pivotally attached to a bracket 16 rigidly mounted on the structure of the rudder 5 in any suitable manner, a pivot pin 17 serving to connect the brackets. The cylinder 13 is provided with a piston 18 slidably mounted therein, and the piston is connected to a bracket 19 rigidly mounted on the structure of the airplane by means of a connecting rod 20 and a pivot pin 21 which serves to connect the latter to the bracket 19. Thus when fluid pressure is admitted to the left end of the cylinder, the motor is effective to rotate the rudder in a counterclockwise direction, and the admission of fluid pressure to the other end of the motor serving to rotate the rudder in the opposite direction. The control valve mechanism 12 is provided with inlet ports 22 and 23, and these ports are supplied with fluid pressure from the reservoir 9 through conduits 24 and 25 connected with the reservoir through a flexible hose 26 and a conduit 27.

Referring now to Fig. 2 of the drawings, the valve mechanism 12 is provided with a casing 28 provided with identical fluid pressure control valves in the upper and lower portions thereof. Referring first to the lower control valve, the casing 28 is provided with an inlet chamber 29 separated from an outlet chamber 30 by means of a ported partition 31, the chamber 29 being provided with inlet port 23 which receives fluid pressure from the conduit 25, and communication between chambers 29 and 30 through the ported partition 31 is normally prevented by means of an inlet valve 32 maintained in the position shown by means of a spring 33 interposed between the upper surface of the partition and the lower surface of an exhaust valve 34 mounted on a stem 35 extending upwardly from the inlet valve. A valve operating element 36 is slidably mounted in the casing as shown and normally maintained in the position shown by means of a spring 37 interposed between the upper surface of the partition and the lower end of the valve operating element. The casing directly above the outlet chamber is provided with a diaphragm chamber 38 connected with the outlet chamber through a restricted passage 39, and a flexible diaphragm 40, suitably clamped in the casing and connected at its center with the valve operating element as shown, forms in connection with the casing, an exhaust chamber 41. The latter chamber is connected with atmosphere by means of a passage 42 and in order to normally permit communication between the outlet chamber and atmosphere, the valve operating element 36 is provided with a bore 43 connected with the exhaust chamber through ports 44 and having its lower end normally spaced from the upper surface of the exhaust valve 34. The outlet chamber 30 is provided with an outlet port 45, and it will be understood that on downward movement of the valve operating element 36, the lower end of the bore 43 will engage the exhaust valve 34 to prevent communication between the outlet chamber 30 and atmosphere, further downward movement of the element serving to open the inlet valve 32 to permit communication between inlet chamber 29 and outlet port 45 through the ported partition 31 and outlet chamber 30. The upper portion of the mechanism 12 is provided with a control valve identical in construction with the lower control valve just described, the upper control valve including an inlet chamber 46 having inlet port 22 connected with the supply conduit 24 shown in Fig. 1, and an outlet chamber 48 having an outlet port 49, a diaphragm chamber 50 connected with the outlet chamber by means of a restricted passage 51, an exhaust chamber 52 connected with atmosphere by means of an exhaust port 53, a diaphragm 54 clamped in the housing and operatively connected with a slidably mounted valve operating element 55 as shown. The valve operating element is provided with a bore 56 connected at its upper end with the outlet chamber 48 and its lower end with the exhaust chamber 52 by means of ports 57. An inlet valve 58 normally maintained in closed position by means of a spring 59, serves to control communication between the inlet and outlet chambers, and an exhaust valve 60 serves to control communication between the outlet chamber and atmosphere through the bore 56, the ports 57, the exhaust chamber 52 and the exhaust port 53. The valve operating element is normally maintained in the position shown by means of a spring 61, and it will be clear that on upward movement of the element, the upper end of the bore 56 will first engage the surface of the exhaust valve to prevent communication between the outlet chamber and atmosphere, and that further upward movement of the element will open the inlet valve to permit fluid pressure to flow from the inlet chamber to the outlet chamber. Operation of the valve operating elements 36 and 55 is accomplished by means of a lever 62 pivotally mounted on a portion of the casing 28 by means of a pivot pin 63, and having a round or ball shaped portion 64 formed on the right end adapted to engage the inner ends of both the valve operating elements when the latter are maintained in the positions shown, by their respective return springs.

Referring again to Fig. 1, the valve mechanism 12 is generally mounted on the structure of the rudder 5 by means of suitable brackets 65, the outlet port 49 of the upper control valve being connected to the right end of the cylinder 13 by means of a flexible conduit 66, and the outlet port 45 of the lower control valve being connected to the left end of the cylinder by means of a flexible conduit 67. The lever 62 is adapted for operation by means of a pair of flexible diaphragms 68 and 69 positioned substantially flush with the upper and lower surfaces of the rudder 5, these diaphragms being clamped to suitable casing members 70 and 71 mounted as shown on the structure of the rudder. The diaphragms are connected with a rod 72 slidably mounted in the members 70 and 71, the rod being operatively connected with the left end of the lever 62 by means of flanges 73 and 74 which are adapted to engage a forked end portion 75 formed on the left end of the lever, downward movement of the rod thus serving to rotate the lever in a counterclockwise direction about the pivot pin 63 in order to move the valve operating element 55 upward, and movement of the rod in the other direction serving to impart clockwise rotation to the lever and downward movement to the valve operating element 36. The casing members 70 and 71 are provided with vent holes 76 and 77 leading to the interior of the rudder, and it will be understood that the interior of the rudder is normally subjected to static pressure of the fluid medium in which the airplane or boat is operating, through suitable vent holes, not shown, in the surface of the rudder, it being well-known that rudders of this type are normally not of air-tight construction. Thus on downward movement of the rod 72, the upper control valve of the mechanism 12 is operated to supply fluid pressure from the reservoir 9 to the right end of the motor 13 through conduit 66, operation of the rod in the other direction serving to operate the lower control valve of the mechanism 12 to supply fluid pressure to the left end of the motor through the flexible conduit 67.

When the airplane or boat is moving to the right in a straight path with the rudder 5 positioned as shown relative to the airplane or boat, it will be understood that under normal atmospheric conditions, for example, the upper and lower surfaces of the rudder will be subjected to the same impact pressure from the slip stream. When the operator moves the cable 7 to the right to impart clockwise rotation to the rudder, the angle of the upper surface of the rudder relative to the force of the slip stream will be changed, with the result that the impact pressure of the slip stream on the surface of the diaphragm 68 will be increased, with a resultant tendency to force the rod 72 downward to rotate the lever 62 in a counterclockwise direction, whereupon the valve operating element 55 is moved upward to close the exhaust valve and open the intake valve of the upper control valve in the mechanism 12 in order to supply fluid pressure to the right end of the fluid motor from the reservoir through conduit 27, conduit 26, conduit 24, inlet chamber 46, outlet chamber 48 and flexible conduit 66, and since the piston rod 20 is attached to the structure of the airplane by means of the pivot pin 21 and the body of the cylinder 12 is attached to the bracket 16 on the rudder structure by means of the pivot pin 17, the cylinder tends to move to the right with respect to the piston rod 20 in order to impart clockwise rotation to the rudder. Although the diaphragm 54 is shown as being of comparatively large size in the valve mechanism 12 in the interest of clarity, it will be understood that in view of the fact that the pressures acting to operate the fluid motor are relatively high compared with the impact pressures acting on the diaphragms 68 and 69, the diaphragms in the control valve mechanism 12 are preferably so proportioned as to have a much smaller area than the diaphragms 68 and 69 which are subjected to the relatively low impact pressure of the slip stream. In this manner, the relatively low impact pressure is effective to operate the valves in order to maintain a relatively high pressure in the fluid motor. When the rudder is turned in a clockwise direction, as stated above, it will also be understood that the action of the slip stream tends to form a partial vacuum adjacent the lower surface of the rudder, and that since the diaphragm 69 is subjected to this partial vacuum, an additional force is applied to the rod 72 tending to move it downward in order to operate the valve mechanism to supply fluid pressure to the right end of the motor. In like manner, movement of the control cable 8 to the right results in counterclockwise rotation of the rudder 5, as a result of which the impact pressure on the lower surface of the rudder increases in the vicinity of and on the diaphragm 69, and this, combined with the vacuum effect on the upper diaphragm 68 when the rudder is so turned, exerts a force tending to move the rod 72 upward in order to rotate the lever 62 in a clockwise direction to move the valve operating element 36 downward, thus operating the lower control valve to supply fluid pressure to the left end of the motor through the flexible conduit 67 whereupon the motor tends to move to the left with respect to the rod 20 in order to impart counterclockwise rotation to the rudder. During this operation of the lower control valve, the pressure in the left end of the fluid motor and in the outlet chamber 30 in the control valve will increase, and since this pressure is conducted to the diaphragm chamber 38 through the restricted passage 39, the diaphragm of the control valve is subjected to the pressure in the fluid motor, and the upward force resulting from this pressure eventually reaches a value sufficient to balance the force exerted on the valve operating element in a downward direction by the operation of the diaphragms 68 and 69 and the lever 62, whereupon the valve operating element 36 is moved upward sufficiently to permit closing of the inlet valve 32 under the action of the inlet valve spring 33, whereupon the valves are in lapped position, and a pressure is maintained in the left end of the motor which is substantially proportional to the combined pressures acting on the diaphragms 68 and 69. Thus it will be apparent that the degree of fluid pressure supplied to the motor by the control valve mechanism 12, as will be well understood by those skilled in the art relative to self-lapping valve construction, is at all times substantially proportional to the slip stream forces acting on the diaphragms 68 and 69. In this connection, it is desirable that the amount of power supplied to the fluid motor be so controlled that the turning moment exerted by the fluid motor on the rudder shall never be sufficient to prevent the rotation of the rudder to neutral position in response to the action of the impact pressure of the fluid medium on the surface of the rudder, as otherwise it would be necessary for the operator to exert manual effort to return the rudder to neutral position. By virtue of the construction herein described, however, the parts may be so designed that the pressure supplied to the fluid motor, and therefore the power developed thereby, is at all times proportional to the impact pressure on the surface of the rudder, and insufficient to prevent the return of the rudder to neutral position by the action of the slip stream when the control cables 7 and 8 are released by the operator. In addition to the foregoing, it is well-known that the force required to operate a rudder of this type increases materially in accordance with increases in the speed of the airplane, and also increases materially as the angle of movement of the rudder from neutral position increases. The system described herein is particularly advantageous in this respect, since the system can be so designed as to govern the power supplied to the fluid motor in accordance with the angle of turn as well as in accordance with the speed of movement of the airplane or boat in the surrounding fluid medium, this being accomplished in such a manner that the power supplied to the motor to turn the rudder away from neutral position never exceeds or equals that necessary to maintain the rudder out of neutral position against the impact pressure of the slip stream. Thus when the rudder is turned from neutral position by the pilot, the power actuator exerts sufficient assistance to permit operation of the rudder without excessive manual effort, and the construction herein described also insures returning of the rudder to neutral position on release of the manual control means by the pilot.

While the pressure responsive members or diaphragms 68 and 69, which are responsive to the impact pressure of the slip stream, have been shown as positioned in the upper and lower surfaces of the rudder 5, it will be understood that they may not be so positioned, but may be located in any desired position in order to control the operation of the valve mechanism 12, provided that they are so positioned as to be moved by the cables 7 and 8 when the rudder is moved in order to vary the impact pressure acting on the pressure responsive members in accordance with the angle of turn and degree of movement of the rudder from neutral position. In like manner, the control valve mechanism 12 may be arranged on the structure of the airplane 4 rather than on the moving rudder if desired, and various other arrangements of the parts may be resorted to without departing from the spirit of the invention.

Thus in the invention disclosed herein there has been provided in connection with a manually controlled rudder having direct and substantially non-yielding connections with the pilot's control element, means for automatically supplying sufficient power to turn the rudder in order to assist the pilot, the degree of power supplied being controlled in accordance with, but not necessarily in direct ratio to, the angle of turn of the rudder, and the speed of movement of the vehicle through a fluid medium. No lost motion between the pilot's control element and the rudder is required in order to operate the valve mechanism for the power actuator, and the pilot is thus provided with an efficient and direct control of the rudder at all times, and is also able to evaluate through a sense of feel any sudden changes in the atmosphere or fluid medium conditions adjacent the surface of the rudder. Although the control system heretofore described has been illustrated as applied to the rudder of an airplane or boat, it will be understood that the same principles may be applied to the control of any type of control surface operating in a fluid medium, such as the ailerons or elevator of an airplane.

While the invention has been illustrated and described herein with considerable particularity, it is to be expressly understood that the same is not limited to the form shown but may receive a variety of mechanical expressions as will readily appear to those skilled in the art. It is also to be understood that while fluid pressure operated means has been shown and described for effecting power operation of the rudder or other device, the invention is not limited to this form of power application, but may be readily adapted to the control of any desired power medium. Reference will, therefore, be had to the appended claims for a definition of the limits of the invention.

What is claimed is:

1. In a control mechanism for controlling the direction of movement in a fluid medium of a body having a rudder movably mounted thereon and means for moving the rudder, additional means for effecting power operation of said rudder including a power actuator for moving the rudder, and means responsive jointly to the impact pressure of the fluid medium on the rudder and to the power supplied to the actuator for controlling the supply of power to said actuator.

2. In a control mechanism for controlling the direction of movement in a fluid medium of a body having a rudder movably mounted thereon and means for moving the rudder, additional means for effecting power operation of said rudder including a power actuator for moving the rudder, and means responsive jointly to the difference in impact pressures of the fluid medium on opposite sides of the rudder and to the power supplied to the actuator for controlling the supply of fluid pressure to said actuator.

3. In a control mechanism for controlling the direction of movement in a fluid medium of a body having a rudder movably mounted thereon and means for moving the rudder, additional means for effecting power operation of said rudder including a power actuator for moving the rudder, and means including a member subjected to the power supplied to the actuator and a pressure responsive element positioned adjacent the surface of the rudder and subjected to the impact pressure of the fluid medium for varying the degree of power supplied to said actuator substantially in accordance with variations in the degree of said impact pressure.

4. In a control mechanism for controlling the direction of movement in a fluid medium of a body having a rudder movably mounted thereon and means for moving the rudder, additional means for effecting power operation of said rudder including a power actuator for moving said rudder, and means for controlling the supply of power to said actuator including a power controlling element, a member subjected to the impact pressure of the fluid medium on the surface of the rudder for moving the element in one direction to supply power to the actuator, and means including a member responsive to the power supplied to said actuator for opposing movement of said element by the first named member with a force proportional to the degree of power supplied to said actuator.

5. In a control mechanism for controlling the direction of movement in a fluid medium of a body having a rudder movably mounted thereon and means for moving the rudder, additional means for effecting power operation of said rudder including a fluid motor for moving the rudder, and means for controlling the supply of fluid pressure to said motor including a valve, an element responsive to the impact pressure of the fluid medium acting on the surface of the rudder for operating said valve, and a member responsive to the pressure of fluid in the actuator for opposing operation of said valve by said element.

6. In a control mechanism for controlling the direction of movement in a fluid medium of a body having a rudder movably mounted thereon and means for moving the rudder, additional means for effecting power operation of said rudder including a fluid motor for moving the rudder, and valve mechanism for controlling the supply of fluid pressure to the motor including a valve, a valve operating element, means responsive to the impact pressure of the fluid medium adjacent the surface of the rudder for moving said element in one direction, and means responsive to the pressure of fluid in the motor for moving the element in the other direction.

7. In a control mechanism for controlling the direction of movement in a fluid medium of a body having a rudder movably mounted thereon and means for moving the rudder, additional means for effecting power operation of said rudder including a fluid motor for moving the rudder, valve mechanism for controlling the supply of fluid pressure to the motor including a valve, a valve operating element, means responsive to the pressure in the motor for moving the element in one direction, and means including a flexible pressure responsive element forming a part of the rudder surface for moving the element in the opposite direction.

8. In a control mechanism for controlling the direction of movement in a fluid medium of a body having a manually operable rudder movably mounted thereon having a neutral position and movable in opposite directions from neutral position to steer the body, means for effecting power operation of said rudder including a power actuator for moving the rudder in either direction from neutral position, and means for controlling the supply of power to said actuator including a power controlling device, pressure responsive means movable with the rudder and subjected to the impact pressure of the fluid medium during manual operation of the rudder in one direction for operating said device to supply power to said actuator to effect power operation of the rudder in said one direction, and pressure responsive means subjected to the impact pressure of the fluid medium during manual operation of the rudder in the opposite direction for operating said device to supply power to the actuator to effect power operation of the rudder in said opposite direction.

9. In a control mechanism for controlling the direction of movement in a fluid medium of a body having a manually operable rudder movably mounted thereon having a neutral position and movable in opposite directions from neutral position to steer the body, means for effecting power operation of said rudder including a double acting fluid motor for moving the rudder in either direction from neutral position, and means for controlling the supply of fluid pressure to said motor including a valve for supplying fluid pressure to the motor to operate the latter and rudder in one direction and a valve for supplying fluid pressure to the motor to operate the latter and rudder in the opposite direction, means including a pressure responsive element movable with the rudder and subjected to the impact pressure of the fluid medium during manual operation of the rudder in one direction for operating said one valve to supply fluid pressure to the motor, and means including a pressure responsive element movable with the rudder and subjected to the impact pressure of the fluid medium during manual operation of the rudder in said opposite direction for operating said second named valve to supply fluid pressure to the motor.

10. In a control mechanism for controlling the direction of movement in a fluid medium of a body having a manually operable rudder movably mounted thereon having a neutral position and movable in opposite directions from neutral position to steer the body, means for effecting power operation of said rudder including a double acting fluid motor for moving the rudder in either direction from neutral position, and means for controlling the supply of fluid pressure to said motor including a valve for supplying fluid pressure to the motor to operate the latter and rudder in one direction and a valve for supplying fluid pressure to the motor to operate the latter and rudder in the opposite direction, means including a pressure responsive element movable with the rudder and subjected to the impact pressure of the fluid medium during manual operation of the rudder in one direction for operating said one valve to supply fluid pressure to the motor, means including a second pressure responsive element movable with the rudder and subjected to the impact pressure of the fluid medium during manual operation of the rudder in said opposite direction for operating said second named valve to supply fluid pressure to the motor, and means for limiting the pressure of fluid supplied to said motor by the operation of said valves, including means responsive to the pressures supplied to the motor by said valves for opposing operation of the valves by the pressure responsive elements with forces proportional to the degree of pressure supplied to said actuator.

11. In a control mechanism for controlling the direction of movement in a fluid medium of a body having a manually operable rudder movably mounted thereon having a neutral position and movable in opposite directions from neutral position to steer the body, means for effecting power operation of said rudder including a double acting fluid motor for moving the rudder in either direction from neutral position, and means for controlling the supply of fluid pressure to said motor including a valve for supplying fluid pressure to the motor to operate the latter and rudder in one direction and a valve for supplying fluid pressure to the motor to operate the latter and rudder in the opposite direction, means including a pressure responsive element movable with the rudder and subjected to the impact pressure of the fluid medium during manual operation of the rudder in one direction for operating said one valve to supply fluid pressure to the motor, means including a second pressure responsive element movable with the rudder and subjected to the impact pressure of the fluid medium during manual operation of the rudder in said opposite direction for operating said second named valve to supply fluid pressure to the motor, and means for limiting the pressure of fluid supplied to said motor by the operation of said valves including a pair of pressure responsive members each subjected to the pressure of fluid delivered to the motor by the operation of one of said valves, the areas of said members being less than the areas of the corresponding pressure responsive elements and so proportioned with respect thereto that the pressure of fluid supplied to said motor is so limited that the moment tending to move the rudder from neutral position in either direction due to the operation of the motor is at all times less than the restoring moment on the rudder due to the impact pressure of the fluid medium acting thereon.

12. The combination with a body adapted to move through a fluid medium having a rudder movably mounted thereon and means for moving the rudder to steer the body, of additional means for effecting power operation of the rudder including a power actuator for moving the rudder, means including a pressure responsive element movable by the first named means and subjected to the impact pressure of the fluid medium for controlling the supply of power to said actuator, and means responsive to the power supplied to said actuator for opposing the force exerted on said element by said impact pressure with a force proportional to the degree of power supplied to said actuator.

13. The combination with a body adapted to move through a fluid medium having a rudder movably mounted thereon and manually operable means for moving the rudder to steer the body, of means for effecting power operation of the rudder including a power actuator for moving the rudder, a pressure responsive element movable with the rudder and subjected to the impact pressure of the fluid medium, and means controlled jointly by said element and by the power supplied to said actuator for supplying power to the actuator and for varying the degree of power supplied thereto substantially in proportion to variations in the degree of force exerted on said element by the action of said impact pressure.

14. The combination with a body adapted to move through a fluid medium having a rudder movably mounted thereon and manually operable means for moving the rudder to steer the body, of means for effecting power operation of the rudder including a fluid motor for moving the latter, a pressure responsive element movable with the rudder and subjected to the impact pressure of the fluid medium, means including a valve operated by said element for supplying fluid pressure to the motor, and means including a member responsive to the pressure of fluid supplied to the motor for opposing operation of said valve by said element, whereby the pressure of fluid supplied to the motor by the operation of the valve is substantially proportional to the impact pressure.

15. The combination with a body adapted to move through a fluid medium having a rudder pivotally mounted thereon having a neutral position, and manually operable means for moving said rudder from neutral position to steer the body, of means for effecting power operation of the rudder with a force substantially proportional to the angle of turn of the rudder from neutral position including a fluid motor for moving the rudder, valve mechanism for controlling the supply of fluid pressure to the motor including a valve, a valve operating element, and a member responsive to the pressure of fluid in the motor for moving the element in one direction, and means including a pressure responsive member movable with the rudder and subjected to the impact pressure of the fluid medium for moving the valve operating element in the opposite direction.

WILFRED A. EATON.